US006783453B2

(12) United States Patent
Bueermann et al.

(10) Patent No.: US 6,783,453 B2
(45) Date of Patent: Aug. 31, 2004

(54) MOUNTING ASSEMBLY FOR STRAW CHOPPER BLADES

(75) Inventors: Martin Bueermann, Haunsheim (DE); Dirk Weichholdt, Sarreguemines (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/230,694

(22) Filed: Aug. 29, 2002

(65) Prior Publication Data

US 2003/0060246 A1 Mar. 27, 2003

(30) Foreign Application Priority Data

Sep. 22, 2001 (DE) ........................................ 101 46 773

(51) Int. Cl.[7] ................................................ A01F 12/40
(52) U.S. Cl. .......................... 460/112; 241/243; 56/504
(58) Field of Search .......................... 56/504, 500, 294, 56/295, 12.5; 241/197; 411/229, 555; 460/112

(56) References Cited

U.S. PATENT DOCUMENTS

| | | | | | |
|---|---|---|---|---|---|
| 960,999 | A | * | 6/1910 | Nicholson | 411/229 |
| 3,177,640 | A | * | 4/1965 | Mott, Jr. | 56/294 |
| 3,292,353 | A | | 12/1966 | Woodring et al. | 56/294 |
| 3,309,854 | A | * | 3/1967 | Mitchell et al. | 56/504 |
| 3,465,507 | A | | 9/1969 | Fishaw | 56/294 |
| 3,606,748 | A | * | 9/1971 | Middlesworth | 56/294 |
| 3,827,110 | A | * | 8/1974 | Dzus et al. | 411/555 |
| 3,831,357 | A | * | 8/1974 | Mathews | 56/294 |
| 4,211,060 | A | | 7/1980 | Rhodes | 56/294 |
| 4,922,698 | A | | 5/1990 | Taylor | 56/295 |

FOREIGN PATENT DOCUMENTS

| | | |
|---|---|---|
| DE | 7 09 246 | 8/1941 |
| DE | 66 05 031 | 3/1970 |
| DE | 70 05 798 | 5/1970 |
| DE | 75 30 714 | 2/1976 |
| DE | 28 17 251 C2 | 11/1978 |
| DE | 36 31 485 A1 | 3/1988 |
| DE | 42 00 096 C2 | 7/1992 |
| DE | 696 10 526 T2 | 5/2001 |
| FR | 2 479 646 | 4/1981 |
| GB | 2 035 840 | 6/1980 |

* cited by examiner

*Primary Examiner*—Árpád Fábián Kovács
e,acu a+ee cs

(57) ABSTRACT

A mounting assembly for fastening blades to a straw chopper rotor. The rotor is provided with a plurality of mounts each mount having a rotor mounting hole. The blades are secured to the mounts. Each blade is provide with a blade mounting hole. A pin is inserted into the rotor mounting hole and the blade mounting hole. The pin is provided with a locking element for holding the pin in place. The locking element having a trapping position where it is locked in place and a loosening position wherein the pin can be removed. The locking element is held in its trapping position by a spring. The locking element engaging a recess having an edge for holding the locking element in the trapping position.

16 Claims, 3 Drawing Sheets

MOUNTING ASSEMBLY FOR STRAW CHOPPER BLADES

FIELD OF THE INVENTION

The present invention is directed to a mounting assembly for mounting blades to a straw chopper rotor.

BACKGROUND OF THE INVENTION

Straw choppers are typically provided with rotors having a plurality of blades. The blades may be pivotally mounted to the straw chopper rotor (see DE 36 31 485 C) with screws and flanged nuts. The blades are pivotally mounted to mounts. The mounts are welded to the straw chopper rotor. In order to attain a certain quality of chopper output and to keep the power requirement of the chopper within limits, the blades, are provided with cutting edges on both sides. The blades are disassembled after approximately 100 to 200 hours of operation and reassembled after reversing the blades to use the other cutting edge. After this operating time the blade is dull, as a rule, the length of cut becomes larger and the power requirement increases considerably. After a further 100 to 200 hours of operation the old blades are exchanged for new blades.

The disadvantage of mounting the blades to the mounts by screws and flanged nuts lies in the large amount of time required for changing or reversing the blades. This operation takes approximately four hours for a complete blade exchange for a combine having six straw walkers.

SUMMARY OF THE INVENTION

When the mounting assembly is assembled a spring brings the locking element in a trapping position in which it cannot be loosened. In this position the normal operation of the straw chopper is performed. The locking element can be brought into a loosening position by the application of an external force, in which it can be loosened from the pin or fastened to the pin. After the removal of the locking element, the blades can be exchanged or turned around rapidly and without any problems.

In this way the result is that the spring securely traps the locking element during normal operation. In order to attach or exchange the blades, the locking element is brought in a simple way out of the trapping position into the loosening position, in which the locking element can be removed. The pin is removed and the blades can be exchanged or rotated. Following this, the mounting assembly is again attached in reverse order.

The spring pre-loads the pin in the axial direction that is, it applies a force to it that attempts to draw the ends into the holes from which they are projecting. By moving the pin (manually or by means of a tool) against the force of the spring, the locking element can be moved between the trapping position and the loosening position. A Belleville spring or a helical spring can be used. In the illustrated embodiment the spring is in contact with the inner side of the projecting head of the pin that is adjacent to the shank. It would also be conceivable for the spring to act on the pin in an indirect manner, wherein the spring acts on the locking element and pre-loads it into the trapping position. Furthermore, the spring could also be a torsion spring that pre-loads the pin and/or the locking element in the rotary direction into the trapping position.

There are a number of possibilities for the attachment of the locking element to the pin. On the one hand the locking element can be applied to the pin in the radial direction. Thereby when the locking arrangement is brought into the loosening position, the locking element is removed by radially sliding it off the pin. This process can be accomplished without any significant loss of time.

The locking element may be, a cylindrical locking pin that is inserted into a compatible opening in the pin. It can extend with both its ends beyond the pin for trapping the pin in the mounting assembly. In place of a pin, the use of a snap ring is also conceivable, that is inserted into a groove in the pin.

In the trapping position it is appropriate to limit the axial movement of the locking pin (or the snap ring), so that it does not become loosened from the pin in an undesirable manner. For this purpose, the edge of a recess in an element, such as a bushing, could be used to which the locking pin comes into contact.

A bayonet attachment could be used for the blades of the straw chopper, in which the locking element is an element that is rigidly attached to the pin or, particularly for repair purposes, a removable element connected to the pin which can be locked and unlocked by a rotation of the pin only in the loosening position. In the trapping position the element is in contact with a counter bearing. Furthermore, in the trapping position the pin is appropriately secured against a rotation relative to the counter bearing so that an undesirable loosening is not to be feared.

The locking element connected to the pin may be a locking pin extending transverse to the longitudinal axis of the pin, that is inserted in a first rotary position of the pin through the holes and a first groove of a recess in its counter bearing. In a second rotary position of the pin the locking pin is arrested in a second groove of the counter bearing. In order to be able to move the pin between the first and the second rotary position, it must be in the loosening position; in the trapping position no rotation is possible. The counter bearing is preferably arranged in a bushing that is supported in a blade.

DETAILED DESCRIPTION

Figure 1:
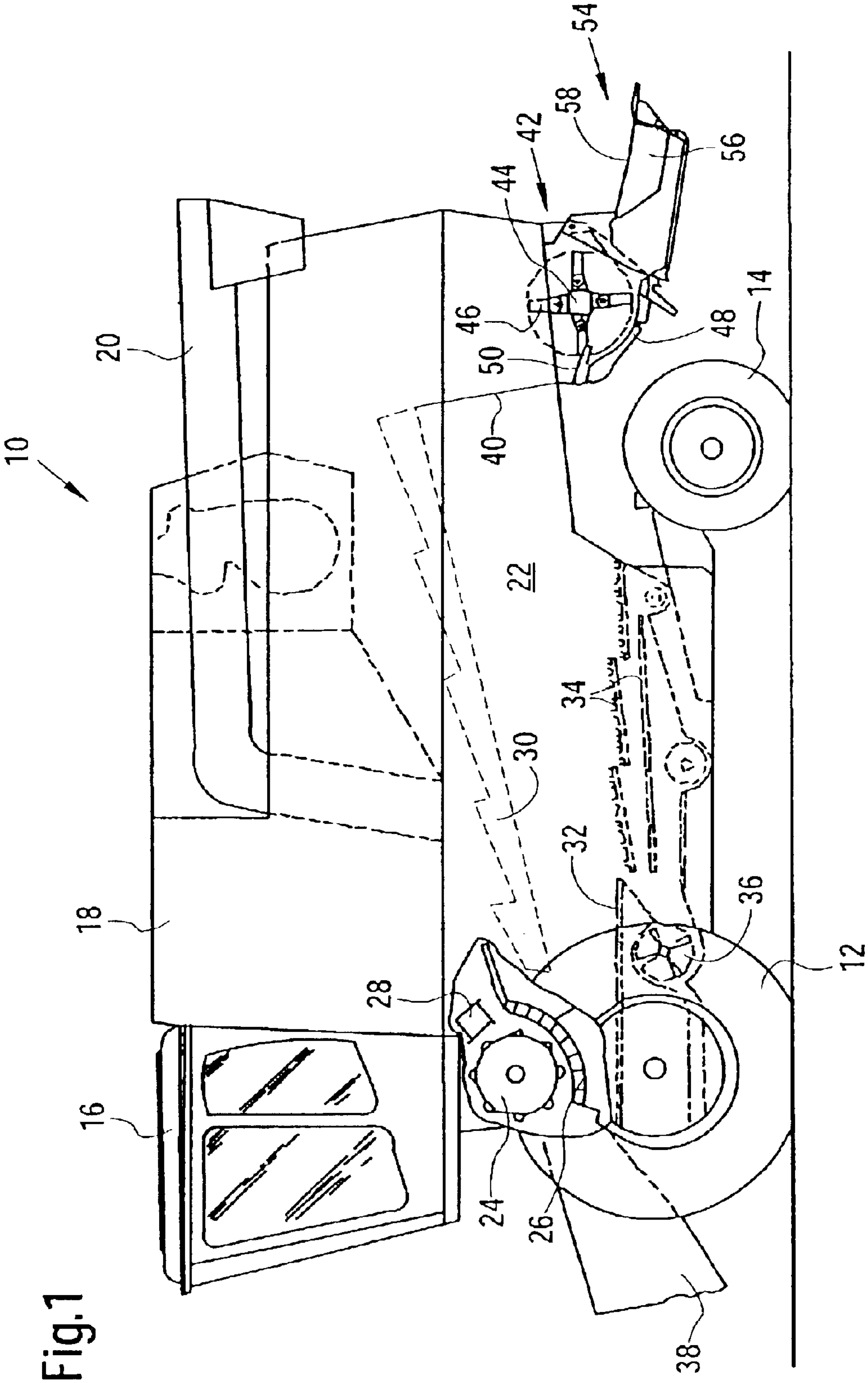
FIG. 1 shows a harvesting machine with a straw chopper.

A harvesting machine 10 shown in FIG. 1 in the form of a combine is carried and propelled on front driven wheels and rear steerable wheels 12 and 14, respectively. The combine is provided with an operator's cab 16 from which it can be controlled by an operator. A grain tank 18 is located behind the operator's cab 16. The grain tank 18 is provide with a discharge auger 20 for directing harvested grain to a waiting grain truck or cart. The grain tank 18 is supported on a frame 22. The harvested crop is separated into its large and small components by the threshing assembly. The threshing assembly comprises a rotating threshing cylinder 24, a stationary concave 26 and a beater 28. Straw walkers 30 are located downstream form the threshing assembly and receives the large components of the threshed crop. Grain and chaff fall from the threshing concave and the straw walkers and are directed to a grain pan 32. The grain pan 32 directs the grain and chaff to the cleaning assembly. The cleaning assembly comprises sieves 34 and blower 36. The blower blows the chaff out the rear of the combine, whereas the cleaned grain is allowed to fall onto the floor of the combine. The cleaned grain is collected and routed to an elevator which lifts the clean grain to the grain tank 18. The large crop components left over after passing across the straw walkers 30 are passed over a straw guide vane 40 to a straw chopper 42. Crop standing or lying on the ground is collected by a harvesting assembly and directed to a feeder house 38. The feeder house 38 conveys the harvested crop past a stone trap to the threshing assembly.

Although the illustrated embodiment discloses a conventional combine having a transverse threshing cylinder and concave, and straw walkers, the present invention could also be used on combines having rotary threshing and separating units, and other types of harvesting machines requiring a straw chopper.

The straw chopper 42 comprises a hollow cylindrical rotor 44 having blades 46 distributed over its circumference and transversely over its length. The blades 46 are pivotally coupled to the rotor 44. The rotor is driven by a drive, not shown, for rotation in housing 48 about an approximately horizontal axis that extends transverse to the direction of operation. The threshed out large crop components are chopped by the blades 46 interacting with the stationary shear bars 50. The rear of the straw chopper 42 is provided with a distributing arrangement 54 having a number of guide vanes 56 that are located beneath a straw distributor hood 58.

Figure 2:
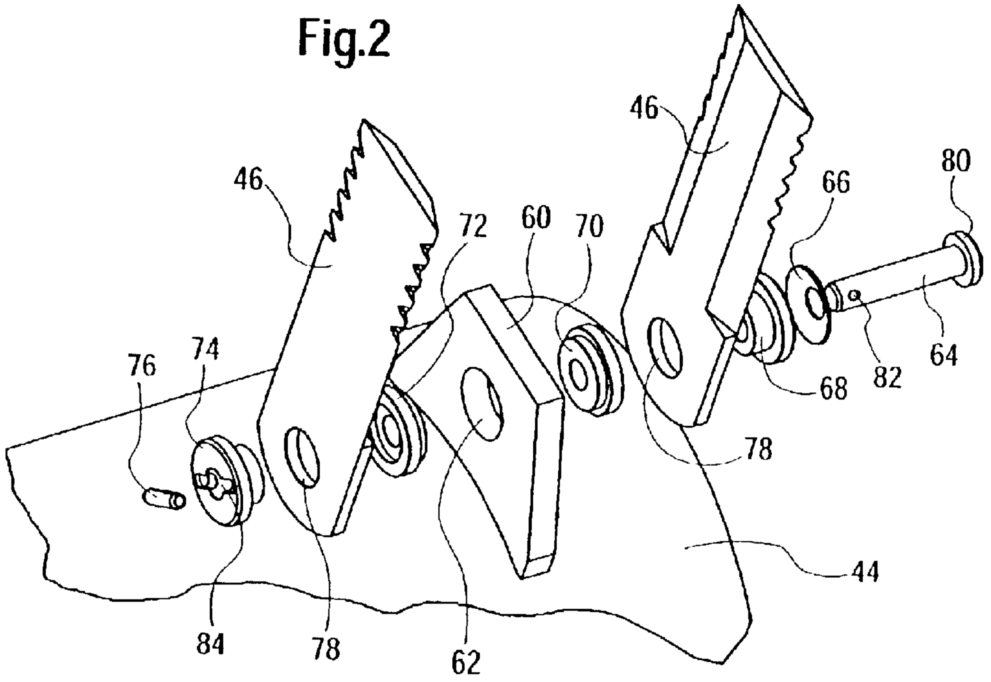
FIG. 2 shows a perspective exploded view of a first embodiment of a mounting assembly of the blades of the straw chopper.
Figure 3:
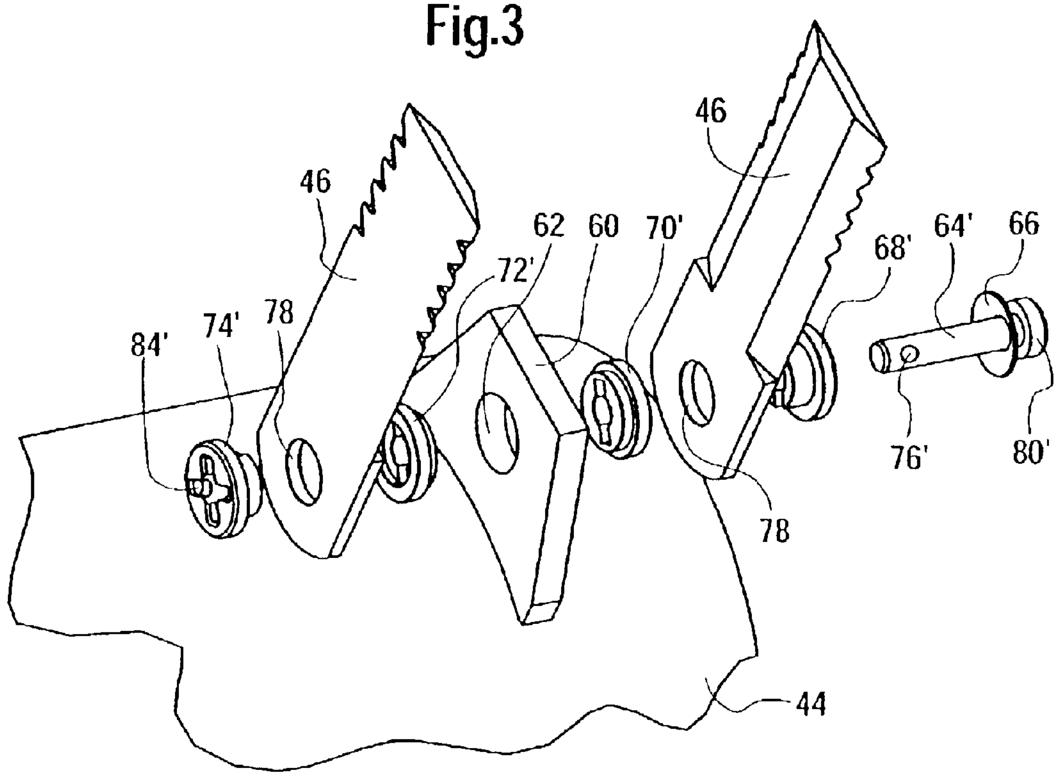
FIG. 3 shows a perspective exploded view of a second embodiment of a mounting assembly of the blades of the straw chopper.

FIGS. 2 and 3 illustrate two embodiments of a mounting assembly for mounting the blades 46 to the rotor 44. FIG. 2 shows an exploded view of a first embodiment of such a mounting assembly. The blades 46 are equipped with ground edges on their long sides and preferably on their outer ends and are fastened in pairs to a mount 60 that is welded or fastened by other means to the rotor 44. A blade 46 is located on each side of the mount 60. The mount 60 extends in the direction of rotation of the rotor 44. The mount 60 is provided with a hole 62 extending in the axial direction of the rotor 44. For mounting the blades 46, a pin 64, a Belleville spring 66, bushings 68, 70, 72, 74 as well as a locking piece 76 are used. The bushings 68, 70 and 72 as well as the blades 46 and the rotor 44 with the mount 60 are elements that are also used with conventional straw choppers 42. Therefore these are available at favorable cost. In the assembled condition the outer bushings 68 and 74 extend into the holes 78 of the blades 46, and the inner bushings extend into the hole 62 of the mount 60. The pin 64 is inserted successively through the central opening of the Belleville spring 66, the central opening of the first bushing 68, a hole 78 in the first blade 46, a central opening in the second bushing 70, the hole 62 in the mount 60, a central opening in the third bushing 72, a hole 78 in the second blade 46 and finally through a corresponding opening in the fourth bushing 74. In the assembled condition, the pin 64 extends through the aforementioned elements where its head 80, that is adjacent to the Belleville spring 66 projects radially outward form the shank. The head 80 prevents the pin 64 from sliding through the opening of the Belleville spring 66. Thereby, the head 80 holds the pin 64 in contact with the Belleville spring 66, which in turn is in contact with the first bushing 68. At its opposite end, the pin 64 is retained by the locking piece 76 acting as a locking element which penetrates the opening 82. The locking piece 76 extends radially from both sides of the pin 64 and is spaced away from the head 80. The outwardly extending portion of the locking piece 76 is in contact with the outer surface of the fourth bushing 74 which projects beyond the opening 82. The Belleville spring 66 axially tensions the pin 64. The tensioned pin 64 is trapped in its axial direction at the fourth bushing 74 and holds together the entire assembly described here.

In order to prevent the locking pin 76 from loosening and escaping out of the opening 82, a recess 84 is provided in the fourth bushing 74 which extends radially and which is shaped with approximately rectangular cross section, that is slightly longer than the locking pin 76 and whose width and depth are somewhat larger than the diameter of the locking pin 76. Thereby the edge of the recess 84 defines the border of the region within which the locking pin 76 can move axially in the recess 84. Therefore the recess 84 could also be circular in shape, since the azimuthal orientation of the locking pin 76 does not have any significance. Since the pin 64 and the remaining elements for the fastening of the blades 46 are dimensioned in such a way that the Belleville spring 66 is compressed when the opening 82 projects beyond the edge of the recess 84 in the axial direction of the pin 64. The spring force of the Belleville spring 66 holds the opening 82 and therewith the locking pin 76 within the recess 84.

To assembly the mounting assembly of the blades 46, the blades 46 with the bushings 68, 70, 72 and 74 are positioned alongside the hole 62. Then the pin 64 which has been inserted into the Belleville spring 66 is inserted through the holes that have been aligned with each other. Vise-grip pliers can then be used to squeeze the head 80 of the pin 64 and the fourth bushing 74 compressing the Belleville spring 66 and extending the pin 64 outwardly from the fourth bushing 74 so that the opening 82 projects beyond the fourth bushing 74. Only after the Bellville spring 66 has been compressed is it possible to insert the locking pin 76 into the opening 82. The vise-grip pliers is removed and the Belleville spring 66 is unloaded, so that it draws the locking pin 76 into the opening 84 in which it is trapped, fixing the mounting assembly. Preferably the spring deflection of the Belleville spring 66 is so small that when the blades 64 are tilted (in FIG. 1 to the left or to the right) they cannot touch the shear bars 50. In a further embodiment, the head 80 of the pin 64 and the fourth bushing 74 may be provided with corresponding flats on its outside or a hexagonal shape that is reproduced in the tensioning arrangement (vise-grip pliers or the like), so that the opening 82 and the recess 84 are in alignment, in order to simplify the assembly. The disassembly is performed in the opposite sequence.

FIG. 3 shows a second embodiment of a mounting assembly according to the invention, where elements that correspond to the first embodiment are identified with identical reference numbers, while elements that differ have the same reference numbers but are further designated with a prime.

In contrast to the first embodiment, in the second embodiment the locking pin 76' is rigidly connected with the pin 64'. The locking pin 76' is configured, for example, as a spring-type locking pin or a dowel pin with a press fit. It could also be welded, attached with adhesive or soldered to the pin 64'. Furthermore the fourth bushing 74' is equipped with a cross-shaped recess 84' that includes a first groove that extends through the bushing 74' and a second groove indexed through 90° thereto, which, however, is configured as a depression, as in the first embodiment. The locking pin 76' prevents the Belleville spring 66 from being lost. In this embodiment all further bushings 68', 70' and 72' must be provided with a slot corresponding to the first groove or a bore, so that the pin 64' with the locking pin 76' can be inserted through it. The head 80' of the pin 64' is preferably provided with an inner (or outer) hexagonal shape or other deformations, in order to make it possible to turn it with a corresponding wrench.

For the assembly of the mounting assembly the blades 46 and the bushings 68', 70', 72' and 74' are aligned with the hole 62 in the mount 60. After the insertion of the pin 64', where the locking pin 76' is conducted through the grooves in the bushings 68', 70', 72', and 74', the head 80' of the pin 64' and the fourth bushing 74' the Belleville spring 66 is compressed with an appropriate tool. The pin 64' and/or the fourth bushing 74' is rotated through 90° with a corresponding tool and the tensioning tool is released. Thereby the locking pin 76' comes into contact in the second groove, that is a blind groove, of the recess 84' of the fourth bushing 74' and thereby arrests the mounting assembly. Here the locking element is the locking pin 76' interacting with the fourth bushing 74'. Here too, the disassembly is performed in the reverse sequence.

It should be noted that in both embodiments it would be conceivable that the Belleville spring 66 be attached at any desirable other location in which it forces the locking pin 76 or 76' into the recess 84 or 84'. It could be arranged between the second bushing 70 or 70' and the mount 60 (then it is indirectly attached to the pin 64, 64') or between the mount 60 and the third bushing 72 or 72' (then it acts upon the fourth bushing 74, 74'). It could also, if necessary with the use of appropriate washers, be positioned between the fourth bushing 74, 74' and the blade 46 shown at left. In all these locations it acts indirectly upon the pin 64, 64' and/or the fourth bushing 74, 74' and forces the locking pin into its arresting position in the recess 84, 84'.

Having described the preferred embodiment, it will become apparent that various modifications can be made without departing from the scope of the invention as defined in the accompanying claims.

What is claimed is:

1. A mounting assembly for the fastening of blades to a straw chopper rotor, the straw chopper rotor having mounts, each mount having a rotor mounting hole, each blade having a blade mounting hole, the mounting assembly comprising:

a pin for insertion into he blade mounting hole and the rotor mounting hole;

a locking element engages the pin and retains the pin in the blade mounting hole and the rotor mounting hole, the locking element having a trapping position and a loosening position;

a spring maintaining the locking element in the trapping position so that the locking element cannot be removed from the pin, the spring tensions the pin axially, the locking element can be brought into the loosening position by moving the pin axially compressing the spring.

2. A mounting assembly as defined by claim 1 wherein the locking element can be removed and attached to the pin when the locking element is in its loosening position.

3. A mounting assembly as defined by claim 2 wherein the spring is a Belleville spring.

4. A mounting assembly as defined by claim 3 wherein the pin is provided with a head having a inner side, the Belleville spring is in contact with the inner side of the head.

5. A mounting assembly as defined by claim 4 wherein the locking element engages the pin in a radial direction.

6. A mounting assembly as defined by claim 5 wherein the locking element is a removable locking pin that can be inserted through an opening in the pin.

7. A mounting assembly as defined by claim 6 wherein the locking element has an axial range of movement that is limited when the locking element is in its trapping position.

8. A mounting assembly as defined by claim 7 further comprising a bushing having a recess define by an edge, the axial range of movement of the locking element is limited by the edge of a recess with which the locking element is in contact.

9. A mounting assembly as defined by claim 2 wherein the pin is provided with a head having an inner side, the spring is in contact with the inner side of the head.

10. A mounting assembly as defined by claim 9 wherein the locking element engages the pin in a radial direction.

11. A mounting assembly as defined by claim 10 wherein the locking element is a removable locking pin that can be inserted through an opening in the pin.

12. A mounting assembly as defined by claim 11 wherein the locking element has an axial range of movement that is limited when the locking element is in its trapping position.

13. A mounting assembly as defined by claim 12 further comprising a bushing having a recess defined by an edge, the axial range of movement of the locking element is limited by th edge of a recess with which the locking element is in contact.

14. A mounting assembly as defined by claim 1 wherein the locking element is a removable locking pin that can be inserted through an opening in the pin.

15. A mounting assembly as defined by claim 14 wherein the locking element has an axial range of movement that is limited when the locking element is in its trapping position.

16. A mounting assembly as defined by claim 15 further comprising a bushing having a recess defined by an edge, the axial range of movement of the locking element is limited by the edge of a recess with which the locking element is in contact.

* * * * *